United States Patent [19]
Chriest et al.

[11] Patent Number: 5,978,767
[45] Date of Patent: Nov. 2, 1999

[54] METHOD AND SYSTEM FOR PROCESSING CAREER DEVELOPMENT INFORMATION

[75] Inventors: Susan L. Chriest; Lynn Z. Baxter, both of Plano, Tex.

[73] Assignee: Electronic Data Systems Corporation, Plano, Tex.

[21] Appl. No.: 08/711,620

[22] Filed: Sep. 10, 1996

[51] Int. Cl.[6] .................................................. G06F 17/60
[52] U.S. Cl. ................................. 705/1; 707/513; 705/11
[58] Field of Search ........................... 364/282.1, 282.3; 395/200.32, 500, 611, 712, 200.36, 200.76; 705/1; 707/1, 4, 10, 535, 501, 513; 345/348

[56] References Cited

U.S. PATENT DOCUMENTS

| | | | |
|---|---|---|---|
| 5,117,353 | 5/1992 | Stipanovich et al. | 374/401 |
| 5,164,897 | 11/1992 | Clark et al. | 364/401 |
| 5,416,694 | 5/1995 | Parrish et al. | 364/401 |
| 5,485,606 | 1/1996 | Midgdey et al. | 395/600 |
| 5,530,852 | 6/1996 | Meske, Jr. et al. | 395/200.36 |
| 5,671,420 | 9/1997 | Bell et al. | 395/712 |
| 5,680,617 | 10/1997 | Gough et al. | 395/615 |
| 5,745,360 | 4/1998 | Leone et al. | 707/513 |
| 5,761,656 | 6/1998 | Ben-Shachar | 707/4 |
| 5,761,673 | 6/1998 | Bookman et al. | 707/104 |

OTHER PUBLICATIONS

Davis, et al., "Successful Manager's Handbook, Development Suggestions for Today's Managers", *Personnel Decisions International*, 1996 Edition, pp. 300–309.

Pricing for Leadership Architect® Products pamphlet, Lominger Limited, Inc., Minneapolis, MN, (undated, copyright 1995).

The Leadership Architect® Suite Product Catalog pamphlet, Lominger Limited, Inc., Minneapolis, MN, (undated, copyright 1995).

The Leadership Architect®: Processing Service pamphlet, Lominger Limited, Inc., Minneapolis, MN, (undated, copyright 1996).

The Leadership Architect®: Portrait Writer™ Software pamphlet, Lominger Limited, Inc., Minneapolis, MN, (undated, copyright 1996).

The Organization Architect™ Tool Set pamphlet, Lominger Limited, Inc., Minneapolis, MN, (undated, copyright 1995).

The Myers–Briggs Type Indicator® Activity in Career Point pamphlet, Conceptual Systems, Inc., Silver Spring, MD, (undated, copyright 1994).

Career Point pamphlet, Conceptual Systems, Inc., Silver Spring, MD, (undated, copyright 1994).

Career Point® Pricing pamphlet, Conceptual Systems, Inc., Silver Spring, MD, (undated).

*Primary Examiner*—Allen R. MacDonald
*Assistant Examiner*—Hani M. Kazimi
*Attorney, Agent, or Firm*—L. Joy Griebenow; Baker & Botts L.L.P.

[57] ABSTRACT

A system (100) for processing career development information is provided which comprises a plurality of career development files (112). Each career development file is associated with at least one other career development file. The system includes a user interface system (120) which receives a user selection of one of the career development files (112) and displays the selected career development file. The system also includes a career library production system (116) with which a curriculum designer can modify one or more of the career development files.

22 Claims, 5 Drawing Sheets

METHOD AND SYSTEM FOR PROCESSING CAREER DEVELOPMENT INFORMATION

TECHNICAL FIELD OF THE INVENTION

This invention relates generally to computer systems and more particularly to a method and system for processing career development information.

BACKGROUND OF THE INVENTION

With the growth in the professional or white-collar class of workers in industrialized countries, there has been a commensurate growth in the demand for career development information. For example, an aspiring professional, such as a college student, may seek information regarding the skills required to enter a given line of work, such as engineering. As another example, an employed professional may seek information regarding the skills required to move from relatively low-level work into management, or to move from his or her current professional field into another profession. Armed with this information, the professional can compare his or her own aptitudes and skills to those required for a given profession to determine whether he or she is suited to the profession in question. The professional may also seek information regarding ways to enhance or develop certain skills so as to advance his or her career in a given direction.

Such career development information has typically been provided through books or other written materials, and through career guidance counselors who specialize in providing such information and advice to professionals. More recently, as computers have become more prevalent in homes and workplaces, attempts have been made to provide such information through computer-implemented systems. Such systems have typically been limited to providing career development suggestions and/or career paths based upon a generalized set of skills. Such systems typically have not been designed to provide career development suggestions based upon a skill or set of skills derived from a job description.

In addition, existing systems have typically been mass-produced for general distribution, and have not been customized to meet the needs of a particular user. For example, the career development suggestions provided by such a system typically have not taken into account, indeed have been unable to take into account, the career development resources available to a particular user, or the professional field in which the user is already employed.

Moreover, such systems have typically been distributed on a physical storage medium such as a CD-ROM or floppy disk, and therefore cannot be easily and routinely updated as new career development information becomes available. As a result, such computer-implemented career development information systems have been of only limited usefulness to professionals.

SUMMARY OF THE INVENTION

Therefore, a need has arisen for a method and system for storing and displaying career development information which can be customized to suit the needs of a particular user or group of users, which provide career development suggestions based upon skills derived from job descriptions, and which can be easily updated with new career development information.

Accordingly a method and system for processing career development information are provided that substantially eliminate or reduce disadvantages associated with prior systems and methods.

In accordance with one embodiment, a method for processing career development information is disclosed. The method comprises displaying on a display device a plurality of skills associated with a job family. User input identifying a selected one of the skills is received, and at least one career development activity associated with the selected one of the skills is displayed on the display device.

In accordance with another aspect of the invention, a system for processing career development information comprises a plurality of career development files. Each career development file is associated with at least one other career development file. The system includes a user interface system which receives a user selection of one of the career development files and displays the selected career development file. The system also includes a career library production system with which a curriculum designer can modify one or more of the career development files.

A technical advantage of the present invention is that a system for processing career development information is provided that contains career development information which may easily be updated or expanded. A further technical advantage of the present invention is that the system contains career development information which may be customized to suit the needs of a particular user or group of users. Yet another technical advantage of the present invention is that the system contains career development information which may be viewed using commercially available user interface systems. Still another technical advantage of the present invention is that the system provides career development suggestions based upon skills derived from job requirements.

BRIEF DESCRIPTION OF THE DRAWINGS

For a better understanding of the present invention, reference may be made to the accompanying drawings, in which.

DETAILED DESCRIPTION OF THE INVENTION

Figure 1:
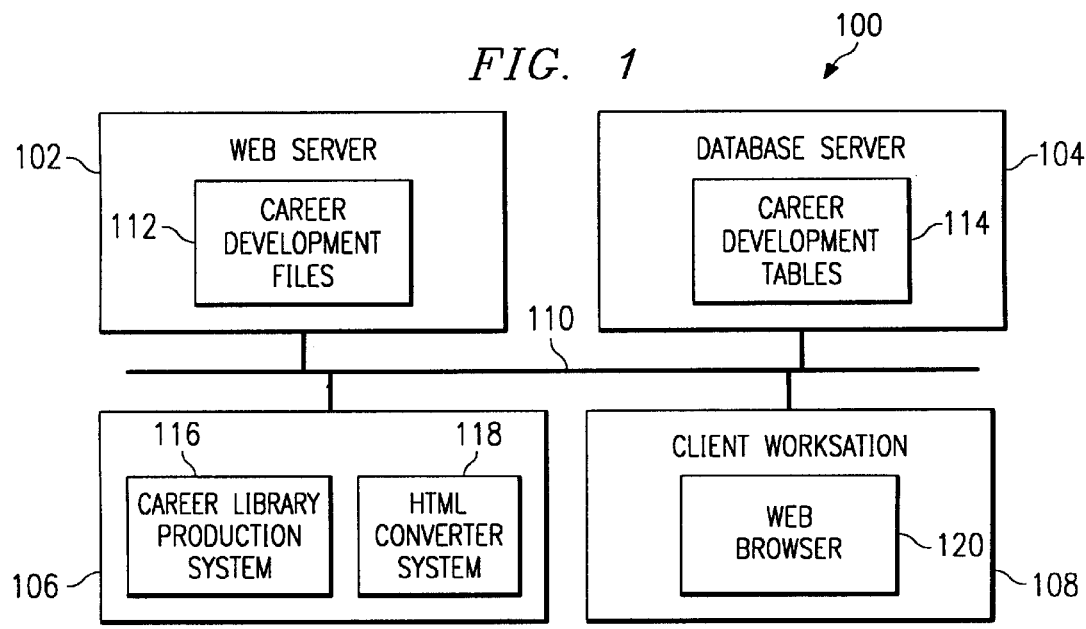
FIG. 1 is a block diagram of an exemplary computer network constructed in accordance with the invention.

FIG. 1 is a block diagram of an exemplary computer network 100 constructed in accordance with one embodiment of the invention. Network 100 may include a local area network (LAN) or wide area network (WAN) or combination thereof. Network 100 comprises a plurality of computer systems 102, 104, 106 and 108 in communication with a network data bus 110. In one embodiment, computer systems 102 and 104 are server systems, while computer systems 106 and 108 are client systems.

Computer system 102 includes a plurality of career development files 112. Computer system 102 may be, for example, a server system referred to as a web server, in which case computer system 102 may comprise a general purpose computer system, as will be described below in connection with FIG. 2, which utilizes a Windows NT or Unix operating system. In this embodiment, career development files 112 may be files created in the well-known hyper-text markup language (HTML) format. This format, used extensively in the World Wide Web, allows files to be "linked" together so that a user viewing a first file may easily view a second file linked to the first file. Thus, various ones of career development files 112 may be linked to various other ones of career development files 112, in a manner to be described below in connection with FIG. 6.

Computer system 104 includes a plurality of career development tables 114, which store information related to that stored by career development files 112. Computer system 104 is, in one embodiment, a database server system such as a SQL server, which may comprise a general purpose computer system utilizing a Windows NT or Unix operating system. The contents of career development tables 114 will be described more fully below in connection with FIG. 3. The relationship between career development tables 114 and career development files 112 will also be described more fully below.

Computer system 106 includes a career library production system 116 and a HTML converter system 118. Computer system 106 may be, for example, a general purpose computer system utilizing a Windows operating system.

Career library production system 116 may be used by a is curriculum designer to add to or modify career development tables 114. According to one embodiment of the invention, career library production system 116 is a computer-implemented application which, when executed, establishes and maintains an open database connection with computer system 104, a SQL server, and communicates therewith over network data bus 110 using TCP/IP addressing, which is a communication format well-known to those skilled in the art of computer networks.

HTML converter system 118 is operable to create career development files 112 from the information stored in career development tables 114. Thus, career development files 112 are derived from career development tables 114, which in turn are created using career library production system 116. The operation of career library production system 116 and HTML converter system 118 will be described more fully below in connection with FIGS. 4 and 5, respectively.

Career library production system 116 and HTML converter system 118 are shown as part of an independent computer system 106 for exemplary purposes only. Those skilled in the art will recognize that either career library production system 116 or HTML converter system 118, or both, may be part of computer system 104 or 108, or another computer system in communication with network 100. Likewise, those skilled in the art will recognize that computer systems 102 and 104 are shown as independent computer systems for exemplary purposes only, and that career development files 112 and career development tables 114 may both be part of a single computer system.

Computer system 108 is, in one embodiment, a client workstation. Computer system 108 includes a user interface system 120, which may be for example a web browser operable to display certain ones of career development files 112 as selected by a user of computer system 108. Examples of well-known and commercially available web browsers suitable for this purpose include Netscape Navigator™ and Mosaic™. Alternatively, user interface system 120 may be operable to directly access and display the information stored in career development tables 114, in the same manner as career library production system 116, which will be described more fully below in connection with FIGS. 4A and 4B. The operation of user interface system 120 will be described more fully below in connection with FIG. 7.

Figure 2:
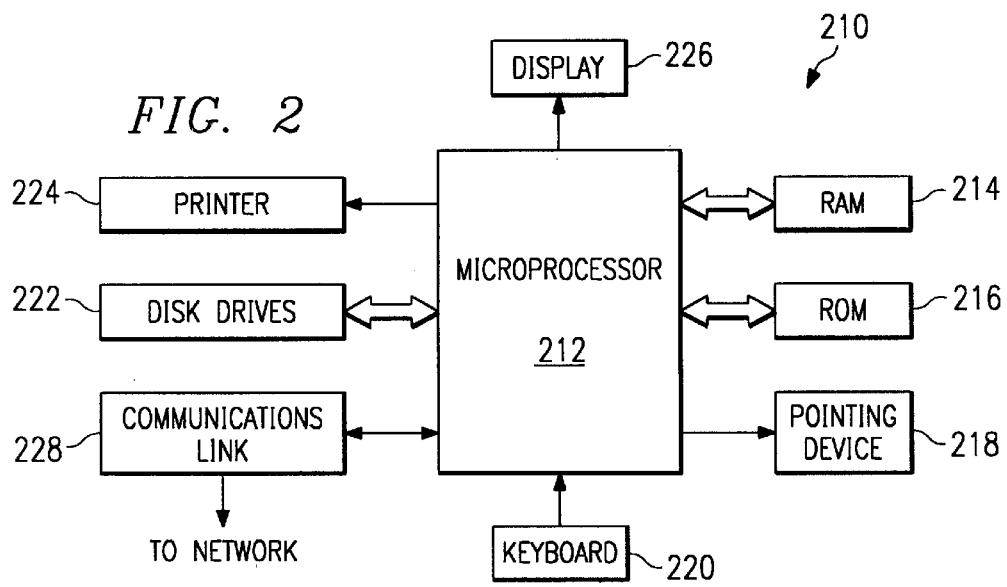
FIG. 2 illustrates a schematic block diagram of a computer system that may be used in connection with the computer network of FIG. 1.

FIG. 2 illustrates a general purpose computer system 210 that may be used to process career development information in accordance with the present invention. For example, as previously described, computer systems 102, 104, 106 and 108 shown in FIG. 1 may comprise such general purpose computer systems. The general purpose computer system 210 may be adapted to execute any of the well-known UNIX, MS DOS, PCDOS, 0S2, MOTIF, MAC-OS, X-WINDOWS and WINDOWS operating systems or other operating systems. The computer system 210 may comprise a microprocessor 212, a random access memory (RAM) 214, a read-only memory (ROM) 216, a pointing device 218 such as a mouse, touchpad or track ball, a keyboard 220, and other input/output devices such as a printer 224, one or more disk drives 222, a display 226 and a communications link 228.

The present invention includes computer software, such as career library production system 116, HTML converter system 118 and user interface system 120, that may be stored in RAM 114, ROM 116 or the disk drives 122. The computer software is executed by the microprocessor 112. The communications link 128 may be connected directly to a computer network, but could be connected to a telephone line, an antenna, a gateway or any other type of communication link. The disk drives 122 may include a variety of types of storage media such as, for example, floppy disk drives, hard disk drives, CD-ROM drives or magnetic tape drives.

Figure 3:
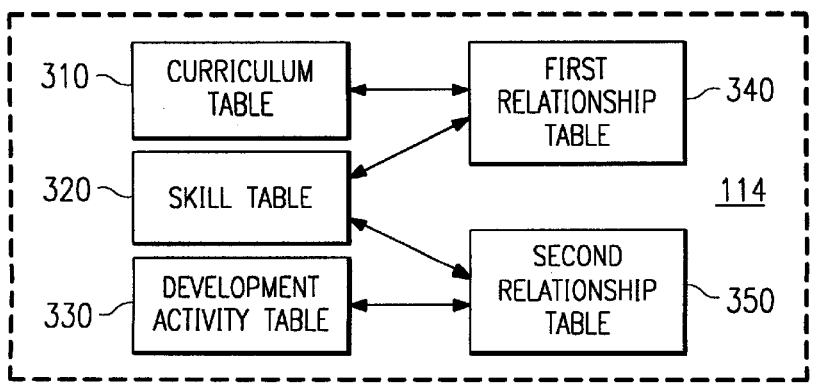
FIG. 3 is a diagram illustrating an exemplary structure and content of career development tables constructed in accordance with the invention.

FIG. 3 is a diagram illustrating an exemplary structure and content of career development tables 114. Career development tables 114 include a curriculum table 310, a skill table 320, a development activity table 330 and first and second relationship tables 340 and 350, respectively.

Curriculum table 310 includes a list of broad job categories or skill groupings referred to herein as curricula. Examples of possible curricula include a "Engineering," "Finance" and "Sales." These are examples of job family-type curricula, each of which may include several job titles or narrower job categories. Other curricula may be generalized skill or behavior categories which are not specific to any particular job title or job category. Examples of this type of curriculum include a "Business and Interpersonal" curriculum and a "Leadership" curriculum. These curricula may be tailored, or new curricula may be added, to more closely match the needs of the users of network 100.

Skill table 320 includes a list of skills or behaviors associated with the curricula listed in curriculum table 310. The skills and behaviors associated with a job family-type curriculum are generally skills and behaviors which are expected of a professional practicing within the curriculum. For example, an "Engineering" curriculum may have skills such as "Repository Management" and "Impact Analysis Support" associated with it.

The skills and behaviors in skill table 320 which are associated with a generalized skill or behavior group curriculum are, as the name implies, skills and behaviors that fall within the generalized skill or behavior group. For example, a "Business and Interpersonal" curriculum may have skills such as "Interpersonal Communication," "Teamwork" and "Presentation/Facilitation" associated with it.

The skills and behaviors listed in skill table 320 may be grouped in a hierarchical system of categorization within each curriculum. For example, the skills and behaviors listed in skill table 320 may be assigned to skill groups referred to herein as topics or subspecialties, or behavior groups referred to herein as attributes. As an example of this type of grouping, the "Repository Management" and "Impact Analysis Support" skills within the "Engineering" curriculum may be grouped, along with other skills, into a "Data Administration" subspecialty.

Subspecialties, topics and attributes may in turn be grouped into broader groups referred to herein as functional specialties or categories. For example, within the "Engineering" curriculum, the subspecialties of "Business Development" and "Customer Service" may be grouped into a "Relationship Management" functional specialty. Individual skills may also be assigned directly to a functional specialty or category, without any subgrouping. For example, the "Interpersonal Communication," "Teamwork" and "Presentation/Facilitation" skills within the "Business and Interpersonal" curriculum may be assigned to a "Relationship Management" category.

At the broadest level of categorization, a job family-type curriculum such as "Engineering" may have skill groups assigned to groups which are even broader than functional specialties and categories. For example, an "Engineering Specialties" group may include a set of functional specialties and subspecialties in the "Engineering" curriculum, such as "Quality Assurance" and "Database Administration Operations." As another example, an "Engineering Professional" group may include generalized groups of skills falling within the "Engineering" curriculum, such as "Market Knowledge," "Business Development" and "Customer Service."

Each level of grouping of skills or behaviors within a curriculum will be referred to herein as a layer or tier. It should be noted that the designer of career development tables 114, referred to herein as a curriculum designer, may group the skills and behaviors within a curriculum using any number of layers or tiers, usually depending on the breadth of the curriculum and the needs of the users of network 100. In fact, as will be discussed more fully below in connection with FIGS. 4A and 4B, the curriculum designer typically designs each curriculum "from the top down," beginning with a curriculum and adding layers or tiers within the curriculum until a set of specific skills or behaviors has been assigned to each group within the curriculum. For example, depending on the preferences of the curriculum designer, some skills may be grouped into subspecialties, which are in turn grouped into a functional specialty, while other skills may be assigned directly to a functional specialty, without being subdivided into subspecialties.

Skill table 320 is structured so that each skill or behavior is logically assigned to its respective lowest-tier group, e.g. its functional specialty or subspecialty. Every group in every tier is logically assigned to its group within the next higher tier, if any, until the highest tier within a curriculum is reached.

The highest layer or tier within a curriculum is assigned to its curriculum by means of first relationship table 340. First relationship table 340 provides a cross-reference between the entries in curriculum table 310 and the skill groups listed in skill table 320. For example, first relationship table 340 may include a series of entries associated with the "Engineering" curriculum listed in curriculum table 310. These entries have unique numerical values which act as "pointers" to skill group entries in skill table 320. All of the skill group entries in skill table 320 that are indicated by such entries in first relationship table 340 are considered to be within the "Engineering" curriculum.

Development activity table 330 includes a list of activities which the curriculum designer considers useful in developing the skills listed in skill table 320. In one embodiment, each skill entry in skill table 320 is associated with at least one development activity entry in development activity table 330. The skill entries in table 320 are associated with the development activity entries in table 330 by means of second relationship table 350, in much the same way that first relationship table 340 provided an association between curriculum entries in table 310 and the skill group entries in table 320.

Those skilled in the art of career development will recognize that the terms "skill" and "behavior" have overlapping definitions, and may to some extent be used interchangeably. Both terms generally describe an action which a professional may be required or expected to perform on the job. Moreover, skills and behaviors are treated in the same manner in computer network 100, and in particular, skills and behaviors occupy equivalent positions within career development tables 114 and career development files 112. For this reason, and for the sake of simplicity, skills and behaviors will henceforth be referred to generically as "skills." In addition, groupings and subgroupings of skills within a curriculum, at any layer or tier, will be referred to generically as "skill groups."

Figure 4A:
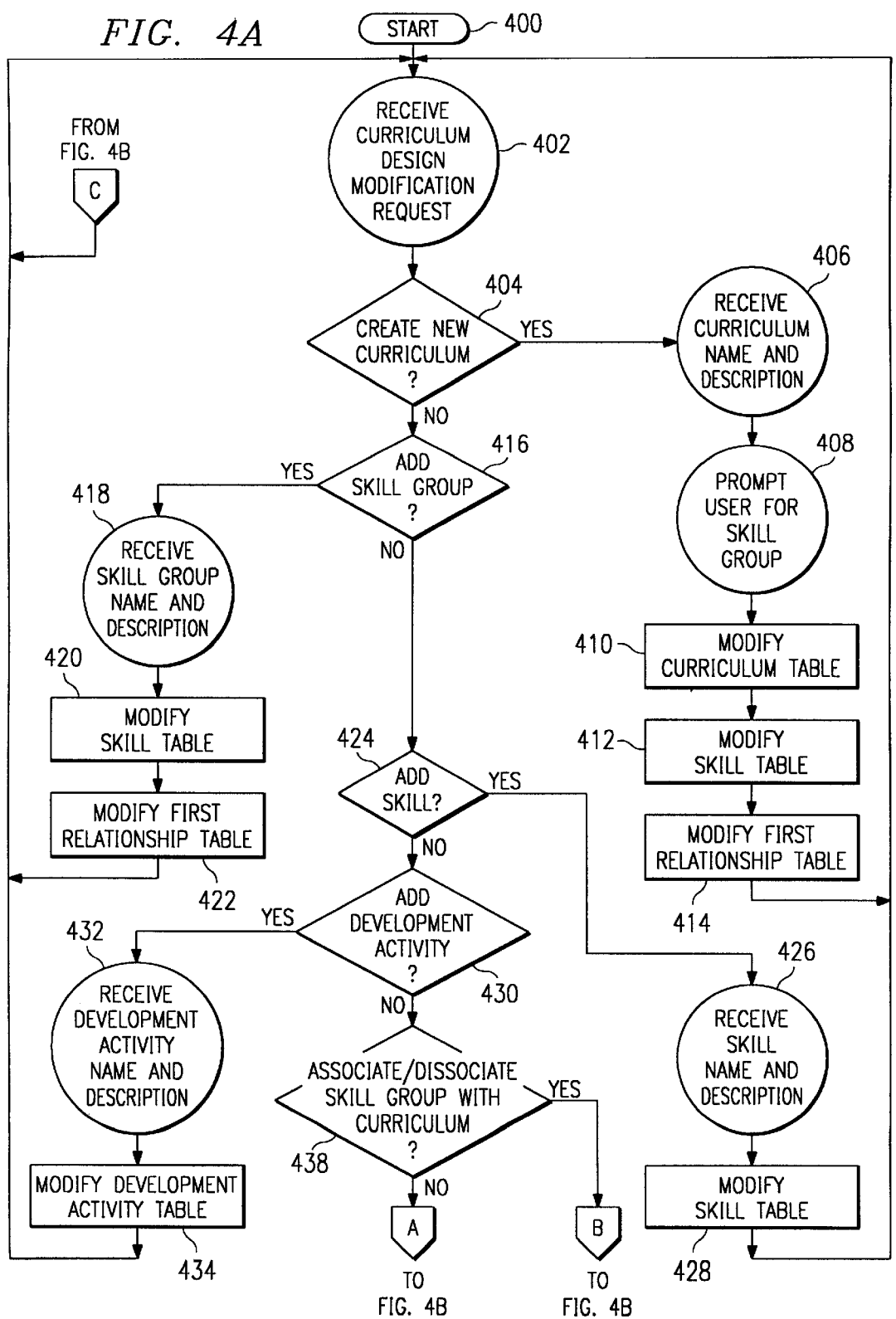
FIGS. 4A and 4B are a flowchart of a method of modifying career development tables in accordance with the present invention.
Figure 4B:
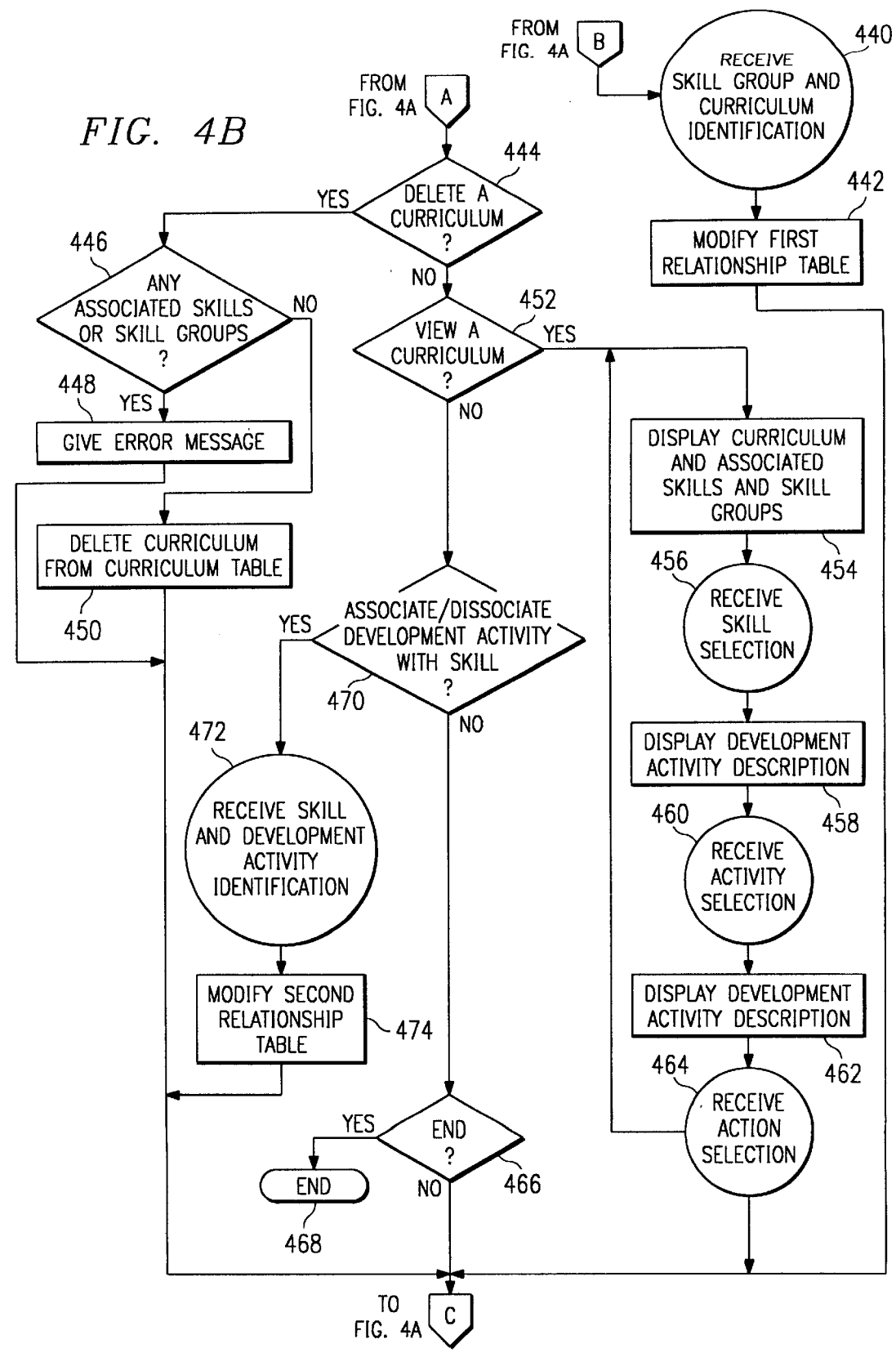

FIGS. 4A and 4B are a flowchart illustrating the operation of career library production system 116. In particular, this flowchart illustrates the means by which a curriculum designer can modify career development tables 114 using career library production system 116. The method begins at step 400 and proceeds to input state 402, where career library production system 116 waits to receive a curriculum design modification request from the curriculum designer.

When such a request is received by the system, the method proceeds to decisional step 404, where career library production system 116 determines whether the request is a request to create a new curriculum. If so, then the method proceeds to input state 406, where career library production system 116 waits to receive a name and description for the new curriculum.

According to one embodiment of the present invention, a new curriculum will not be added to curriculum table 310 until at least one skill group has been associated with the new curriculum. The method therefore proceeds to input state 408, where career library production system 116 prompts the curriculum designer for a skill group to be associated with the new curriculum. The skill group could be either a new skill group or an existing skill group which the curriculum designer wishes to associate with the new curriculum. If a new skill group is selected, the curriculum designer will be prompted for a name and description of the new skill group.

The method then proceeds to step 410, where curriculum table 310 is modified by adding the new curriculum as an entry. Proceeding to step 412, skill table 320 is modified to reflect the addition of a new skill group, if one was specified at step 408. The method proceeds to step 414, where first relationship table 340 is modified to provide a pointer indicating the association between the new curriculum entry and the new or existing skill group entry. The method then returns to input state 402, where career library production system 116 waits to receive another curriculum design modification request.

If the curriculum designer did not choose to add a new curriculum, then the method proceeds from decisional step 404 to decisional step 416, where career library production system 116 determines whether the curriculum designer has requested to add a new skill group. This could be a grouping at any layer or tier in the previously-described hierarchical categorization of skills. Thus, the added group could be, for example, a subspecialty within an existing functional specialty, in which case the curriculum design modification request includes an identification of the functional specialty to which the subspecialty is to be added.

Alternatively, the added skill group could be at the highest level of grouping within a curriculum. For example, the added group could be a functional specialty within a job family-type curriculum. In this case, the curriculum design modification request includes an identification of the curriculum to which the functional specialty is to be added.

If a new skill group is to be added, the method proceeds to input state 418, where career library production system 116 prompts the curriculum designer for a name and description of the new skill group. Proceeding to step 420, skill table 320 is modified to reflect the addition of the new skill group, either within an existing group in skill table 320 or as a new skill group to be assigned to a curriculum. In the latter situation, the method proceeds to step 422, where first relationship table 340 is modified to reflect the association between the new skill group and the curriculum to which the skill group belongs. The method then returns to input state 402, where career library production system 116 waits to receive another curriculum design modification request. If the system designed assigned the new skill group to an existing skill group in skill table 320, then first relationship table 340 need not be modified at step 422, and the method proceeds directly from step 420 to input state 402.

Returning to decisional step 416, if the curriculum designer did not choose to add a new skill group, then the method proceeds to decisional step 424, where career library production system 116 determines whether the curriculum designer has requested to add a new skill to career development tables 114. If so, the method proceeds to input state 426, where career library production system 116 prompts the curriculum designer for a name and description of the new skill. The name of the skill is a brief title which is descriptive of an action which a professional may be required or expected to perform on the job. The description includes text describing the action and a business reason for that action. Proceeding to step 428, skill table 320 is modified to reflect the addition of the new skill.

According to one embodiment of the invention, the curriculum design modification request received in step 402 is received by means of a graphical user interface (GUI) which displays in a hierarchical "tree" format the existing curricula, skill groups and skills. In this embodiment, a request to add a skill is accomplished by indicating, by means of a pointing device such as a mouse, the skill group to which the skill is to be added. Therefore, career library production system 116 "knows" which skill group is to be associated with the new skill. Accordingly, at step 428, skill table 320 is also modified to associate the selected skill group with the new skill. The method then returns to input state 402, where career library production system 116 waits to receive another curriculum design modification request.

Returning to decisional step 424, if the curriculum designer did not choose to add a new skill, then the method proceeds to decisional step 430, where career library production system 116 determines whether the curriculum designer has requested to add a new development activity to career development tables 114. If so, the method proceeds to input state 432, where career library production system 116 prompts the curriculum designer for a name and description of the new development activity. Proceeding to step 434, development activity table 330 is modified to reflect the addition of the new development activity. The method then returns to input state 402, where career library production system 116 waits to receive another curriculum design modification request.

Returning to decisional step 430, if the curriculum designer did not choose to add a new development activity, then the method proceeds to decisional step 438, where career library production system 116 determines whether the curriculum designer has requested to dissociate or associate an existing skill group with an existing curriculum.

As was previously described in connection with step 416, a new skill group is assigned upon creation to either an existing skill group or an existing curriculum. In the case of a skill group assigned directly to a curriculum, the curriculum designer may later wish to reassign the skill group to another curriculum. This is accomplished by first dissociating the skill group from its original curriculum, and then associating the skill group with another curriculum.

Thus, at decisional step 438, if the curriculum designer elects to either dissociate or associate a skill group with a curriculum, the method proceeds to input state 440, where career library production system 116 waits to receive input identifying the skill group and curriculum to be dissociated or associated. When the input has been received, the method proceeds to step 442, where first relationship table 340 is modified to either provide a pointer indicating the association between the identified curriculum and skill group, when the two are to be associated, or delete such a pointer, when the skill group and curriculum are to be dissociated. The method then returns to input state 402, where career library production system 116 waits to receive another curriculum design modification request.

If, at step 438, the system determines that curriculum designer did not choose to dissociate or associate a skill group with a curriculum, then at decisional step 444, career library production system 116 determines whether the curriculum design modification request was a request to delete a curriculum. If so, then at decisional step 446, career library production system 116 reads career development tables 114, and more specifically first relationship table 340, to determine whether the curriculum selected for deletion is associated with any skill or skill group entries in skill table 320.

If entries indicating such associations exist in first relationship table 340, then at step 448, an error message is displayed for the curriculum designer, indicating that the curriculum designer should dissociate the curriculum from all skills and skill groups before attempting to delete the curriculum. If no such entries exist in first relationship table 340, then the method proceeds from decisional step 446 directly to step 450, where the curriculum selected for deletion is deleted from curriculum table 310. The method then returns to input state 402, where career library production system 116 waits to receive another curriculum design modification request.

If, at step 444, the system determines that curriculum designer did not choose to delete a curriculum, then at decisional step 452, career library production system 116 determines whether the curriculum design modification request was a request to view a selected curriculum. This option allows a curriculum designer to view the information stored in career development tables 114, which may be useful in deciding what modifications to make to career development tables 114. If the curriculum designer has selected this option, then at step 454, career library production system 116 determines, from the information stored in first relationship table 340 and skill table 320, which skills and skill groups are associated with the selected curriculum. The selected curriculum and its associated skills and skill groups are then displayed for the curriculum designer.

At input state 456, career library production system 116 waits to receive input from the curriculum designer selecting one of the displayed skills. When a skill has been selected, the method proceeds to step 458, where career library production system 116 determines, from the information stored in second relationship table 350 and development activity table 330, which development activities are associated with the selected skill. The selected skill and its associated development activities are then displayed for the curriculum designer.

At input state 460, career library production system 116 waits to receive input from the curriculum designer selecting one of the displayed development activities. When a development activity has been selected, the method proceeds to step 462, where a description of the selected development activity is displayed.

Proceeding to input state 464, career library production system 116 waits to receive input from the curriculum designer selecting the next action to be taken. If the curriculum designer chooses to return to a view of the selected curriculum and its associated skills and skill groups, then the method returns to step 454. If instead the curriculum designer chooses to execute a new curriculum design modification request, then the method returns to input state 402, where career library production system 116 waits to receive another curriculum design modification request.

If, at decisional step 452, the system determines that the curriculum designer did not choose to view a curriculum, then at decisional step 470, career library production system 116 determines whether the curriculum design modification request was a request to dissociate or associate a development activity with a skill. As was previously described in connection with steps 430 through 434, a new development activity may be added to development activity table 330 without any association with an existing skill. In order to provide helpful career guidance to a user of network 100, a development activity must be associated within career development tables 114 with at least one skill which is enhanced by the performance of the development activity.

If the curriculum designer elects to either dissociate or associate a development activity with a skill, the method proceeds to input state 472, where career library production system 116 waits to receive input identifying the development activity and skill to be dissociated or associated. When the input has been received, the method proceeds to step 474, where second relationship table 350 is modified either to provide a pointer indicating the association between the identified development activity and skill, when the two are to be associated, or to delete such a pointer, when the development activity and skill are to be dissociated. The method then returns to input state 402, where career library production system 116 waits to receive another curriculum design modification request.

If, at decisional step 470, the system determines that the curriculum designer did not choose to dissociate or associate a development activity with a skill, then at decisional step 466, career library production system 116 determines whether the curriculum designer has requested to end the execution of career library production system 116. If so, the method proceeds to step 468, where execution ends. If not, then the curriculum designer has made an unintelligible curriculum design modification request, and the method returns to input state 402, where career library production system 116 waits to receive another curriculum design modification request.

It will be recognized by those skilled in the art that the flow chart shown in FIGS. 4A and 4B is only an exemplary illustration of the process performed by career library production system 116, and that career library production system 116 may present other options to a curriculum designer during execution, in addition to those options described above. For example, the curriculum designer may be allowed to reassign skill subgroups within skill table 320 to different skill groups, or to copy entire skill groups for assignment to other curricula or other skill groups. As another example, career library production system 116 may allow the curriculum designer to terminate execution at any step in the process.

When career development tables 114 have been created and/or modified to the satisfaction of the curriculum designer using the above-described method, it still remains to put the information stored in these tables into a user-accessible format. While career development tables 114 represent a very efficient way to store career development information, these tables do not present the information in a format which is accessible and easy to read for the average network user.

As was previously noted, user interface system 120 is operable to read career development tables 114 and present the information contained therein to the user. However, given the interlinked nature of the information contained in career development tables 114, HTML files such as career development files 112 represent a convenient and easier-to-use format for presenting this information to the user.

Figure 5:
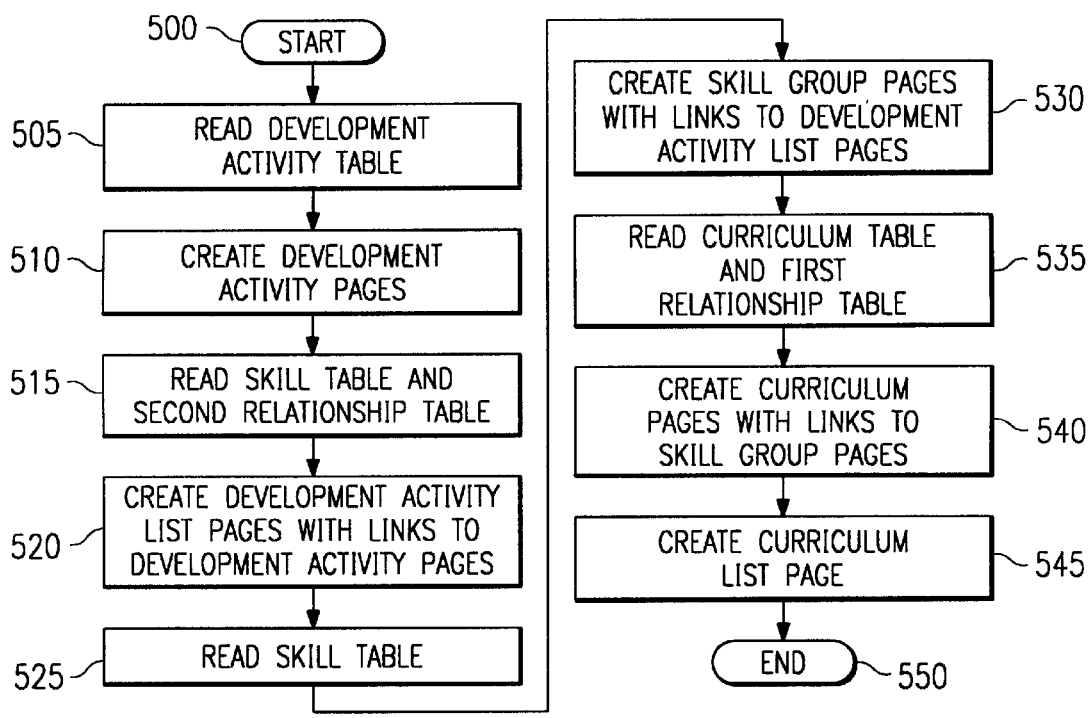
FIG. 5 is a flowchart of a method of creating career development files in accordance with the present invention.

FIG. 5 is a flowchart of a method of creating career development files 112 in accordance with the present invention. This flowchart illustrates the method by which HTML converter system 118 creates career development files 112 using career development tables 114.

The method begins at step 500 and proceeds to step 505, where HTML converter system 118 reads the entries in development activity table 330. At step 510, HTML converter system 118 creates a career development activity page for each development activity table entry. Each development activity page includes the name and description of the development activity as entered by the curriculum designer.

Those skilled in the art will recognize that an HTML file is commonly referred to as a "web page." Accordingly, the term "page" as used herein shall denote an HTML file.

Proceeding to step 515, HTML converter system 118 reads the skill entries in skill table 320 and the pointers in second relationship table 350. Then, at step 520, HTML converter system 118 uses this information to create a development activity list page for each skill, with the appropriate hypertext links to the previously-created development activity pages. Thus, each development activity list page has links to all of the pages containing development activities with which the skill is associated by means of second relationship table 350. Each development activity list page also includes the name and description of the skill as entered by the curriculum designer.

At step 525, HTML converter system 118 reads the skill group entries and their associated skill entries from skill table 320. Then, at step 530, HTML converter system 118 uses this information to create skill group pages. Each skill group page includes a list of the skills in the group, with the appropriate links to the previously-created development activity list pages. Each skill group page also includes the name and description of the skill group as entered by the curriculum designer.

Depending on the number of layers or tiers created by the curriculum designer within a curriculum, some of the skill group pages created at step 530, representing certain skill groups, may include lists of skill subgroups rather than lists of skills. These skill group pages are linked to the skill group pages which correspond to the listed skill subgroups, rather than being linked directly to development activity list pages. The skill group pages corresponding to the skill subgroups may in turn be linked either directly to development activity list pages or to other skill group pages representing further subgroupings of skills. In this way, the previously-described hierarchical grouping of skills within skill table 320 is duplicated in the relationships between the various skill group pages and the development activity list pages.

Proceeding to step 535, HTML converter system 118 reads the entries from curriculum table 310 and first relationship table 340. Then, at step 540, HTML converter system 118 uses this information to create curriculum pages with the appropriate links to some of the previously-created skill group pages. As a result, each curriculum page is linked to the skill group pages representing skill groups with which the curriculum is associated in career development tables 114.

At step 540, HTML converter system 118 may also create a curriculum description page (not shown) for each curriculum page. Each curriculum description page includes the name and description of the curriculum, as entered by the user. Each curriculum page includes a link to its respective curriculum description page.

Finally, at step 545, HTML converter system 118 creates a curriculum list page, which includes a list of the curriculum pages and links thereto. The method then proceeds to step 550, where execution of HTML converter system 118 ends.

Figure 6:
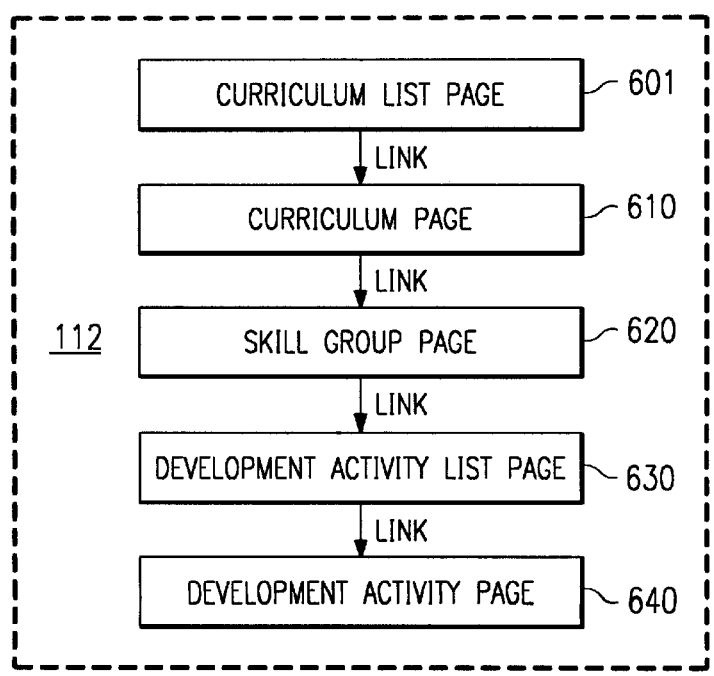
FIG. 6 is an exemplary diagram illustrating the structure and contents of career development files constructed in accordance with the invention.

The end result of the operation of HTML converter system 118 is illustrated in FIG. 6, which is a diagram illustrating the structure and contents of career development files 112. Curriculum list page 601 includes the names of, and hyper-text links to, all curriculum pages. Each curriculum page 610 is associated by means of a hyper-text link to at least one skill group page 620, which is in turn linked to at least one development activity list page 630, either directly or through one or more other skill group pages which represent subgroups within the skill group described in skill group page 620. Development activity list page 630 is in turn linked to at least one development activity page 640, which contains one or more suggestions concerning methods or resources for developing the skill in question.

Career development files 112 may include additional files or pages such as a welcome page, orientation pages, help pages, index pages and comment pages. These additional pages are created individually by the curriculum designer, rather than automatically through the operation of HTML converter system 118. For example, index pages may be created through the use of a search engine implemented on computer system 102. The search engine reads pages 601 through 640 and creates one or more index pages listing key words or phrases appearing in pages 601 through 640, and providing hyper-text links to the pages in which the key words and phrases appear. A welcome page, orientation pages and help pages may also be created by the curriculum designer to assist users in accessing pages 601 through 640. Comment pages operable to store user comments may be provided to give users the option to enter comments about the career development files 112. This feedback allows the curriculum designer to tailor the content of career development files 112 to the needs of the users of network 100.

Figure 7:
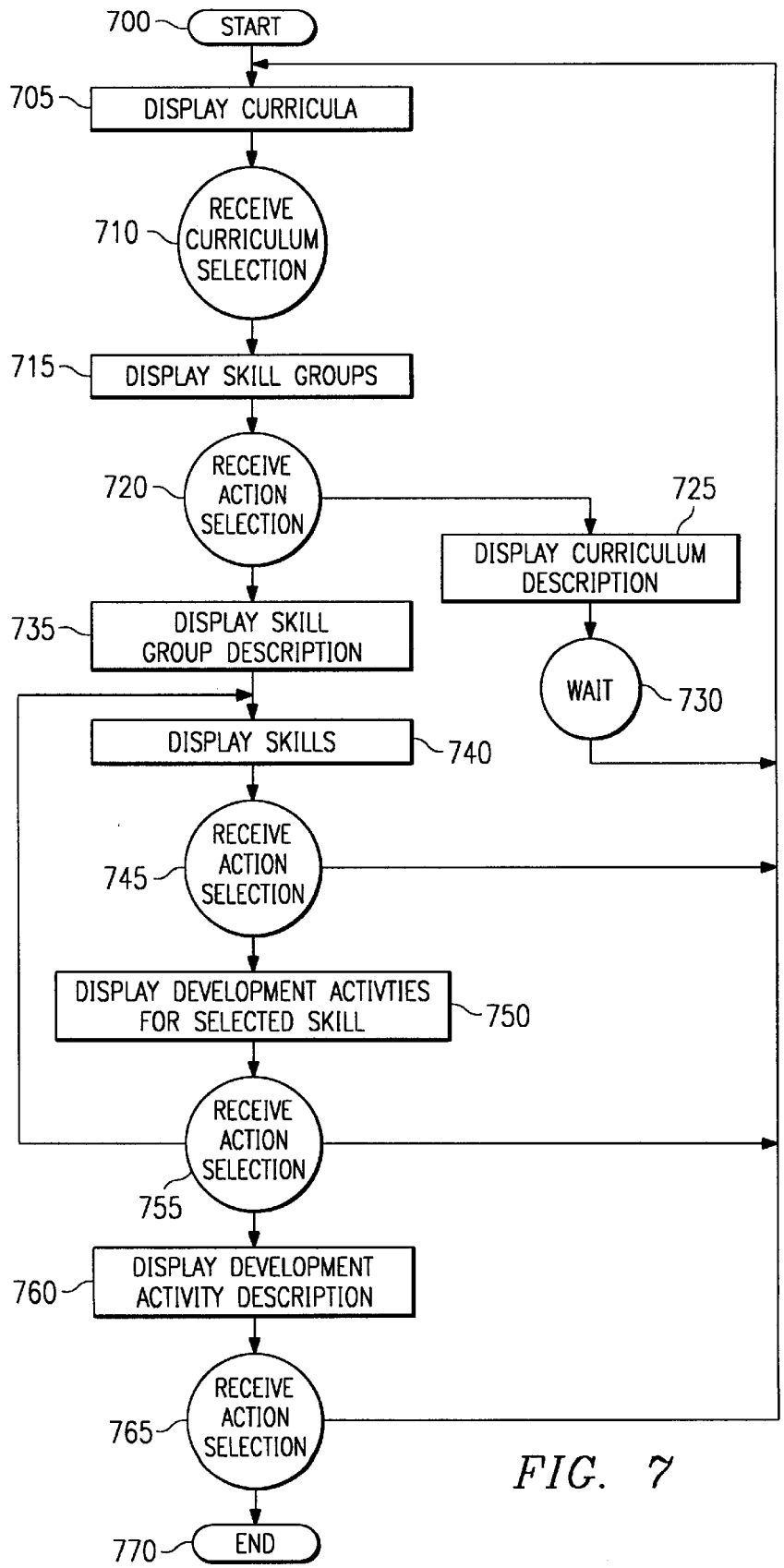
FIG. 7 is a flowchart of a method of displaying career development information in accordance with the present invention.

FIG. 7 is a flowchart of a method of displaying career development information in accordance with the present invention. In particular, this flowchart illustrates the process by which the career development files 112 created by HTML converter system 118 are displayed to a network user utilizing user interface system 120, which may be a commercially available web browser.

The method begins at step 700 and proceeds to step 705, where user interface system 120 displays curriculum list page 601 to the user. At input state 710, where user interface system 120 waits to receive a curriculum selection from the user. When a curriculum selection has been entered, typically by means of a pointing device such as a mouse, the method proceeds to step 715, where user interface system 120 displays the curriculum page for the selected curriculum. The curriculum page includes a list of skill groups associated with the curriculum, and a link to the curriculum description page associated with the curriculum.

At input state 720, where user interface system 120 waits to receive an action selection by the user. If the user chooses to view the curriculum description, the method proceeds to step 725, where user interface system 120 displays the curriculum description page linked to the previously selected curriculum page. The method then proceeds to wait state 730, where user interface system 120 waits for the user to read the curriculum description and indicate a desire to continue, at which point the method returns to step 705, where the curriculum list page is once again displayed for the user.

Returning to action selection state 720, if the user selects one of the skill groups listed in the curriculum page, then the method proceeds to step 735, where the description of the skill group is displayed, and then to step 740, where the skills associated with the skill group are displayed. Both the description of the skill group and the skills associated with the skill group are displayed as part of the skill group page.

It is understood that in some instances, step 735 may not lead directly to step 740, depending on the number of layers or tiers into which the curriculum designer has elected to group the skills within the selected skill group. For example, after step 735, the user may be presented with a choice of skill subgroups within the skill group selected at step 720. When one of these subgroups has been selected, skills assigned to the selected subgroup may be displayed, as at step 740. Alternatively, yet another choice of skill groups within the selected subgroup may be displayed. This process continues until a skill group in the lowest tier has been selected, at which point the skills within the skill group are displayed at step 740.

The method then proceeds to action selection state 745, where user interface system 120 waits to receive an action selection from the user. If the user elects to return to the curriculum list, then the method returns to step 705, where the curriculum list page is once again displayed for the user.

Returning to action selection state 745, if the user selects one of the skills listed in the skill group page, the method proceeds to step 750, where the development activity list page for the selected skill is displayed, including a list of the development activities associated with the selected skill. The method then proceeds to action selection state 755, where user interface system 120 waits to receive an action selection from the user. If the user chooses to return to the most recently displayed skill group page, then the method returns to step 740, where the list of skills associated with the skill group is once again displayed.

If the user elects to return to the curriculum list while at action selection state 755, then the method returns to step 705, where the curriculum list page is once again displayed for the user. If the user instead selects one of the displayed development activities while at action selection state 755, then the method proceeds to step 760, where the appropriate development activity page, including a description of the selected development activity, is displayed.

The method then proceeds to action selection state 765, where user interface system 120 waits to receive an action selection from the user. If the user elects to return to the curriculum list, then the method returns to step 705, where the curriculum list page is once again displayed for the user. If the user instead chooses to terminate the application while at action selection state 765, then the method proceeds to step 770, where execution of user interface system 120 terminates.

It will be recognized by those skilled in the art that additional options could be made available to the user at each step in FIG. 7. For example, at each action selection state, the user could be given an opportunity to terminate the application, in which case the method would proceed directly to step 770. As another example, at each action selection state, the user could be presented with the option to return to the page which immediately preceded the page currently being displayed.

In an alternative embodiment of the invention, career development files 112 may be made available to computer system 108 on a portable storage medium such as a CD-ROM or floppy disk. In this embodiment, computer system 108 is a general purpose computer system as illustrated in FIG. 2, and need not be connected to network 100. Computer system 108 may therefore be a stand-alone personal computer or a client workstation on another network. Career development files are downloaded from computer system 102 to, for example, a CD-ROM. The CD-ROM is then read using a CD-ROM drive 222 of computer system 108.

Because career development files 112 are identical in format and content whether stored on CD-ROM or in computer system 102, the same user interface system 120 is used to access the information stored in career development files 112. For example, if career development files 112 comprise HTML files, user interface system 120 may comprise a commercially available web browser, which is equally effective in reading career development files 112 from computer system 102 or from CD-ROM drive 222.

While the invention has been particularly shown and described by the foregoing detailed description, it will be understood by those skilled in the art that various other changes in form and detail may be made without departing from the spirit and scope of the invention which is solely defined by the appended claims. In particular, it will be understood by those skilled in the art that, while reference has been made to particular network configurations, operating systems, applications and file formats, such as Netscape Navigator™, SQL™ and HTML, the principles of the invention can be applied more generally to other types of computer systems, applications and formats.

What is claimed is:

1. A method for processing career development information, comprising the steps of:

storing a plurality of skill entries in a plurality of career development tables on a computer system;

processing a plurality of pointers from at least one relationship table associated with the plurality of career development tables, each pointer defining a relationship between at least two of the career development tables;

converting the career development tables into a plurality of linked career development pages in response to the processed pointers;

generating a career development activity page associated with a career development activity;

displaying on a display device one of the linked career development pages, the displayed career development page including a subset of the plurality of skill entries, the subset being associated with a job family;

receiving a user input identifying a selected one of the skill entries from the subset; and displaying on the display device the career development page associated with the selected skill entry, the career development page including a link to the career development activity page.

2. The method of claim 1 and further comprising the step of displaying on the display device a description of the selected one of the skills.

3. The method of claim 1 and further comprising the step of displaying on the display device a skill group associated with the job family, the skill group including the plurality of skills.

4. The method of claim 1 and further comprising the step of storing information pertaining to the skills in a plurality of pages.

5. The method of claim 4 and further comprising the steps of:

receiving input from a curriculum designer identifying a change in the skills; and modifying at least one of the pages in accordance with the input from the curriculum designer.

6. The method of claim 4 wherein the step of receiving input from the curriculum designer comprises the step of receiving input from the curriculum designer identifying a new skill to be added to the plurality of skills.

7. A system for processing career development information, comprising a plurality of career development tables;

at relationship table defining at least one relationship between at least two of the plurality of career development tables;

a converter system operable to convert the plurality of career development tables into a plurality of linked career development pages in response to the at least one relationship defined in the relationship table, the converter system further operable to generate a career development activity page associated with a career development activity;

a user interface system operable to receive user input identifying a selected one of the career development pages, the user interface system further operable to display on a display device the selected career development page, the selected career development page including a displayed link to the generated career development activity page; and a career library production system operable to cause a modification of at least one of the career development pages.

8. The system of claim 7 and further comprising:

a computer network having first and second computer systems, the first computer system having a storage device;

wherein the career development pages are stored on the storage device of the first computer system; and wherein the second computer system includes the user interface system.

9. The system of claim 7 wherein the first computer system comprises a file server system.

10. The system of claim 7 wherein the career development pages further comprise a series of hypertext linked documents accessed utilizing a web-based interface.

11. The system of claim 10, wherein the career library production system is operable to modify at least one of the career development tables.

12. The system of claim 10, wherein the career library production system is operable to create at least one of the career development tables.

13. The system of claim 7 wherein the user interface system is operable to display on the display device a link between the selected one of the career development pages and another one of the career development pages.

14. The system of claim 7 wherein the user interface system is operable to receive user input identifying a career development page associated with the selected one of the career development pages, and to display on the display device information stored in the career development page associated with the selected one of the career development pages.

15. A method for processing career development information in a computer system, comprising the steps of:

storing information pertaining to a plurality of skills in a plurality of tables on the computer system;

receiving input from a curriculum designer identifying a change in the plurality of skills;

modifying at least one of the plurality of tables in accordance with the input from the curriculum designer;

processing a plurality of pointers, the pointers operable to identify a relationship between at least two of the tables;

converting the plurality of tables into a plurality of pages;

generating a career development activity associated the a career development activity;

linking one of the pages to at least one other page in response to the processed pointers;

displaying one of the pages, the displayed page having a list of links associated with the plurality of skills, each link operable to display a particular page associated with a particular skill when selected;

receiving input from a user of the computer system identifying a selected one of the skills, the input being operable to select the link associated with the selected one of the skills; and displaying on a display device the linked page associated with the selected one of the skills, the linked page including a link to the career development activity page associated with the selected one of the skills.

16. The method of claim 15 and further comprising the step of displaying on the display device a description of the selected one of the skills.

17. The method of claim 15 and further comprising the step of displaying on the display device information associated with the development activity.

18. The method of claim 15 and further comprising the step of displaying a skill group including the plurality of skills.

19. The method of claim 15 and further comprising the step of displaying on the display device information associated with the skill group.

20. The method of claim 15 wherein the step of receiving input from the curriculum designer comprises the step of receiving input from the curriculum designer identifying a new skill to be added to the plurality of skills.

21. A method for processing career development information in a computer system, comprising:

accessing a plurality of career development entries in a development activity table, each career development entry including a name of a career development activity;

accessing a plurality of skill entries in a skill table, one of the skill entries associated with the development activity table;

generating a career development activity page for each career development entry;

converting the development activity table into a development activity list page for each skill entry, the development activity list page including at least one hypertext link to one of the career development activity pages;

displaying a specific development activity list page using a web browser;

receiving an input from a user using the web browser;

selecting a hypertext link in response to the input; and navigating between the development activity list page and one of the career development activity pages in response to the selected hypertext link.

22. The method of claim 21 and further comprising:

storing a plurality of curriculum entries in a curriculum table, at least one of the curriculum entries associated with the skill table;

converting the skill table into a skill group page, the skill group page including a list of skills associated with a specific skill group, the list including at least one hypertext link to the career development activity list page;

converting the curriculum table into a curriculum list page, the curriculum list page including at least one hypertext link to the skill group page;

displaying the curriculum list page; and navigating between the curriculum list page and one of the career development activity pages in response to a plurality of additional inputs entered by the user using the web browser.

\* \* \* \* \*